Sept. 27, 1955  A. C. ROBLEY  2,718,871
VACUUM CONTROL FOR MAGNETIC MILKING MACHINES
Filed April 11, 1951  2 Sheets-Sheet 2
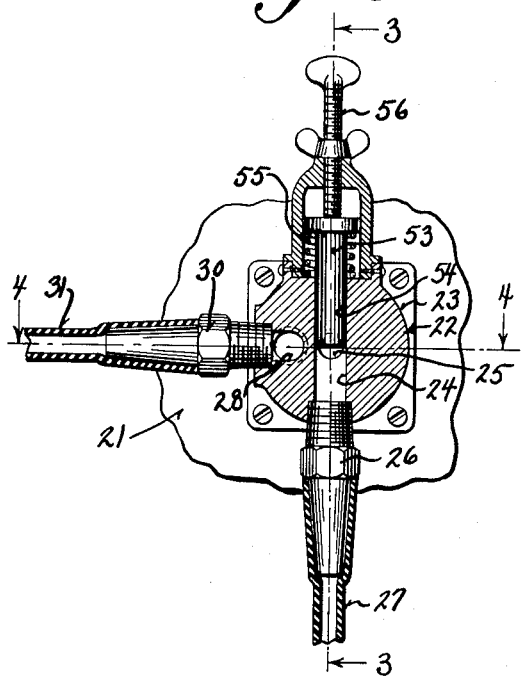
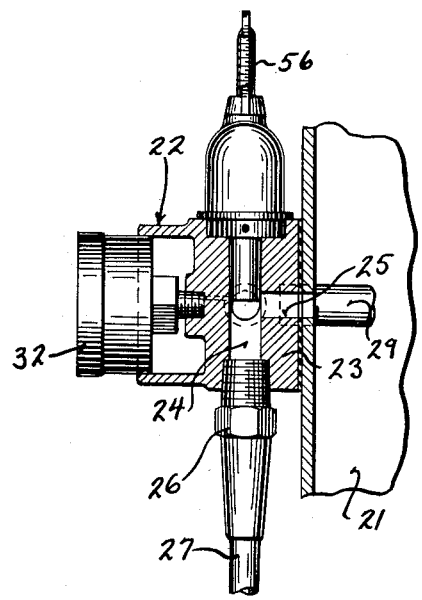
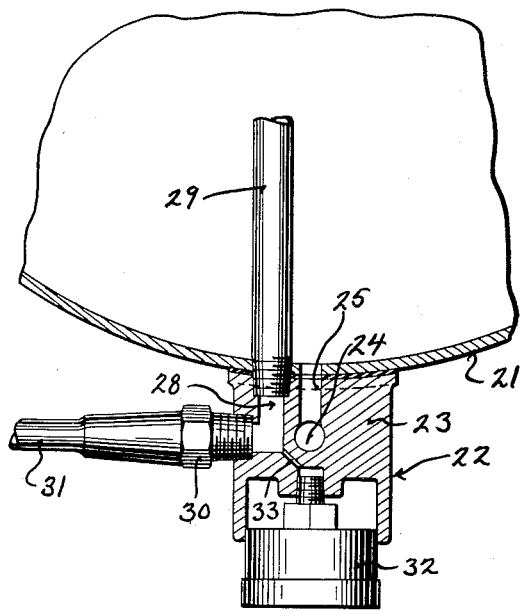
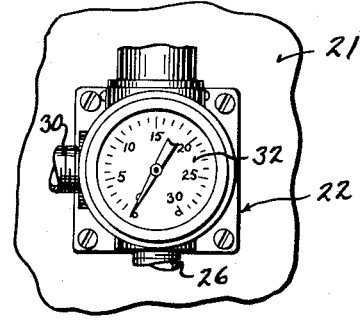
INVENTOR
ARTHUR C. ROBLEY
BY
*Young & Wright*
ATTORNEYS

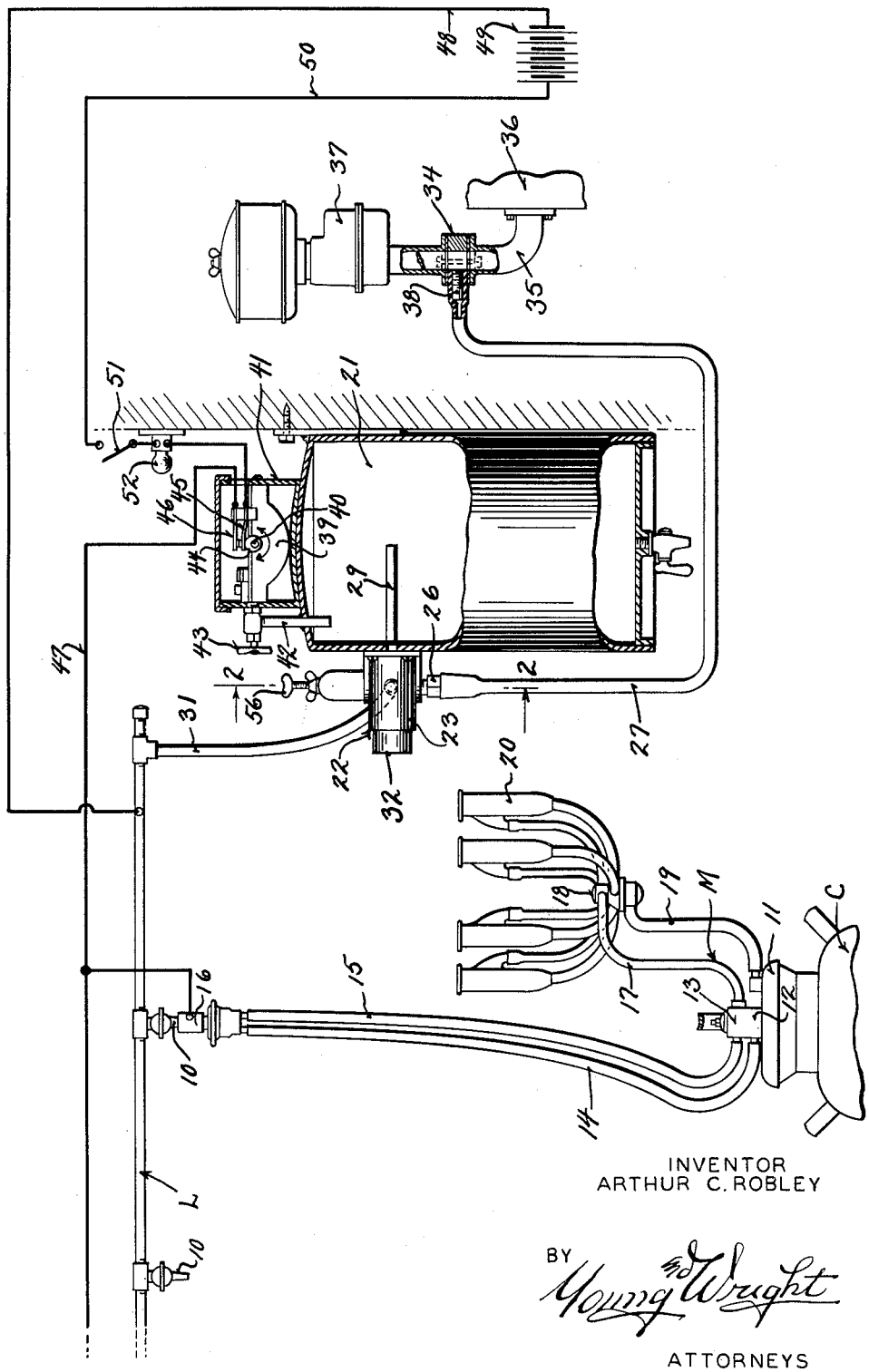

United States Patent Office 2,718,871
Patented Sept. 27, 1955

2,718,871

VACUUM CONTROL FOR MAGNETIC MILKING MACHINES

Arthur C. Robley, Milwaukee, Wis.

Application April 11, 1951, Serial No. 220,443

1 Claim. (Cl. 119—14.28)

This invention appertains to milking machines, and more particularly to milking machines in which pneumatic pulsations are imparted to the pulsation chambers of teat cups.

One of the primary objects of my invention is to provide novel means for developing the necessary vacuum or suction from the intake of an internal combustion engine, so as to eliminate the necessity of providing an electric or other driven exhaust pump, whereby in case of electric power failure, the vacuum suction system can be successfully operated off of the intake of the engine of an automobile.

Another salient object of my invention is the provision of a milking machine in which the only electrical appliance utilized is a magnetic pulsator, whereby the electric current necessary therefor can be derived from a storage battery, such as the storage battery of an automobile.

A further object of my invention is the provision of a vacuum tank interposed between the intake of the internal combustion engine and the vacuum line of the milking machine whereby the tank will effectively act as a trap for foreign matter.

A further object of the invention is to provide means for connecting the tank with the intake of the internal combustion engine between the carburetor and the intake manifold whereby to increase the suction in the tank and to positively prevent the entrance of any foreign matter into the carburetor.

A still further important object of the invention is the provision of a vacuum operated motor connected with the vacuum tank for actuating a circuit maker and breaker in proper timing for the magnetic pulsator, whereby to eliminate the necessity of employing an electrically operated circuit maker and breaker, and the difficulties contingent with the use thereof.

A still further important object of the invention is the provision of a single casing connected with the vacuum tank, for facilitating the connection of the vacuum line for the milking machine with the tank and the tank with the intake of the internal combustion engine.

A further object of the invention is the provision of means in said casing for insuring a constant suction of predetermined value in the suction line.

With these and other objects in view, the invention consists in the novel construction, arrangement and formation of parts, as will be hereinafter more specifically described and claimed, and illustrated in the accompanying drawings, in which drawing, Figure 1 is a diagrammatic view showing my novel suction or vacuum system incorporated with the vacuum line and magnetic pulsator of a milking machine of a type now found on the open market, parts of the view being shown broken away and in section to illustrate structural details.

Figure 2 is an enlarged detail vertical sectional view through the casing employed for connecting the vacuum tank with the milking machine vacuum line and the intake of an internal combustion engine.

Figure 3 is a vertical sectional view through the casing taken at right angles to Figure 2 and on the line 3—3 of Figure 2, looking in the direction of the arrows.

Figure 4 is a horizontal sectional view taken on the line 4—4 of Figure 2, looking in the direction of the arrows.

Figure 5 is a face view of the casing illustrating more particularly the pressure gauge.

Referring to the drawings in detail, wherein similar reference characters designate corresponding parts throughout the several views, the letter M indicates a milking machine of a well known type now found on the open market, for use with a vacuum line L in a barn or the like. In accordance with the usual practice, the vacuum line L is provided at spaced points with valve control nipples 10.

The milking machine M is adapted to be detachably connected with the neck of a milk pail or can C.

The milking machine M will not be described in detail, but the same includes a cover 11, for the milk pail or can C, to which is attached the combination suction chamber 12 and pulsating chamber unit 13. Leading from the suction chamber 12, is the flexible hose line 14 for suction, and leading from the chamber 13 is the flexible hose line 15, for pulsations. These lines are connected with a magnetic pulsator 16 of the type shown in the Hapgood Patent No. 1,914,123, issued June 13, 1933. The magnetic pulsator is coupled with any valve controlled nipple 10, as may be desired. Also leading from the pulsating chamber 13, is a flexible line 17, which leads to the claw 18 of the milking unit. A milk line 19, leads to the cover 11. As in the usual practice, the claw 18, has communication with the pulsating chambers of the teat cups 20.

In accordance with my invention, I provide a vacuum tank 21, which can be secured to the wall of a barn. Means is provided for creating a constant suction in the vacuum tank and the vacuum tank in turn is connected to the vacuum line L. To simplify construction, I rigidly secure to the wall of the vacuum tank 21, a single unit 22, which includes a casing 23. The casing 23 is provided with a vertical bore 24 and this bore communicates with the tank 21 through a passageway 25. Threaded into the wall of the bore 24 is a hose coupling 26, and connected to this coupling 26 is a flexible pipe 27. Also formed in the casing 23 is a second passageway 28, and threaded into the wall of the passageway 28 is a tube 29 which leads into the tank 21. Also threaded into the bore of the passageway 28 is a hose coupling 30 and this coupling 30 has connected therewith a flexible pipe 31, which leads to and is connected with the vacuum line L. Consequently, when a vacuum is developed in tank 21, suction will be created in the line L. Connected with the casing 23 is a pressure guage 32, and a port 33 in the casing 23 connects the pressure guage with the bore 28.

One of the important features of my invention is the provision of means for creating the suction or vacuum in the tank 21, and I prefer to develop this vacuum or suction from the intake of an internal combustion engine, which may or may not be a part of a standard automobile or truck. As illustrated in Figure 1, I utilize a gasket 34 which is interposed in the intake pipe 35 between the intake manifold 36 and the carburetor 37. The gasket 34, is provided with an inlet nipple 38, and connected to this nipple is the flexible hose or pipe 27. Hence, when the internal combustion engine is running, suction will be created in the tank 21.

By interposing the gasket 34 between the intake manifold 36 and the carburetor 37, the maximum amount of suction is developed and any impurities flowing into the gasket will not interfere with the carburetor. However, the tank 21 forms an important part of this invention, as the same functions as a trap for impurities, to prevent foreign matter from reaching the engine. Likewise, by providing the tank 21, a convenient means is provided for attaching various parts of my apparatus.

By utilizing the suction of an internal combustion engine, I eliminate the necessity of driving a suction pump.

As heretofore brought out, one of the important features of the invention is to reduce the consumption of electric current, and in order to open and close an electric circuit to the magnetic pulsator 16 in proper timed relation, I utilize a vacuum motor 39. This vacuum motor is of a type commonly used on windshield cleaners for automobiles, and consequently includes an oscillating shaft 40. The motor 39, can be of the type shown in Patent No. 1,674,056, issued to Oishei et al., June 19, 1928, and No. 1,849,327, issued to Hueber, March 15, 1932. The vacuum motor 39 can be placed in a suitable housing 41, attached to the top of the tank 21, and the motor has communication with the tank through the use of an inlet pipe 42. Flow of air through the pipe 42, is controlled by a hand operated valve 43. Secured to the oscillating shaft 40, is a cam 44, which operates the resilient leaf 45 of a switch 46. One terminal of the switch has connected thereto an electric conducting wire 47, which leads to and is electrically connected with one terminal of the magnetic pulsator 16. The other terminal of the magnetic pulsator is grounded to the vacuum line L and electrically connected to the line L is an electric conducting wire 48, leading to one terminal of a storage battery 49, or other source of electrical energy. The other terminal of the battery 49, has electrically connected therewith a wire 50, which leads to the resilient leaf 45 of the electric switch 46. A hand operated switch 51, can be interposed in the length of wire 50, to manually control the circuit to the magnetic pulsator 16. A signal light 52 can also be used in the circuit.

During operation of the motor 39, the switch 46 is alternately opened and closed by the cam, and consequently the circuit is alternately opened and closed to the magnet pulsator. Preferably, the cam 44 is designed so that the switch 46 is closed 40% of the time, and open 60% of the time.

In operation, a vacuum is developed in tank 21 and in the vacuum line L and the pulsations in the cups 20 are regulated by the magnetic pulsator 16, which is in turn controlled by the motor 39. The speed of operation of the motor 39, is controlled by setting the valve 43. By utilizing the motor 39, a positive uniform rate of oscillation of the cam 44 is had and the same is not interrupted by current failure or the like.

While the source of electric energy for the magnetic pulsator 16 can be derived from any suitable place, it is to be understood that the wires 48 and 50 can be connected to the storage battery of an automobile or truck.

Means is also provided for automatically regulating the suction created in the line L so as to prevent fluctuations in the line. This can include a spring pressed plunger 53 slidably mounted in a bore 54 formed in the casing 23. The bore 54 is in alignment with the bore 24, and intersects the passageway 25. An expansion coil spring 55 normally tends to raise the plunger 53 above the passageway 25. An adjusting screw 56 can be threaded down against the plunger 53 to limit the upward movement thereof, so as to manually regulate the active size of the passageway 25. After the setting of the screw 56, if suction is created beyond a desired degree, then the tension of the spring 53 will be overcome and the plunger will be sucked downwardly to decrease the active size of the passageway 25.

Various changes in details may be made without departing from the spirit or the scope of this invention, but what I claim as new is:

In a milking apparatus of the type including a vacuum line, a vacuum tank having communication with the line, means for creating a continuous suction in the vacuum tank and a magnetic pulsator; an electric circuit including the magnetic pulsator, a source of electrical energy and a circuit maker and breaker, the circuit maker and breaker including a stationary contact and a movable contact, a vacuum motor having communication with the vacuum tank and supported thereby including an oscillating shaft and a cam secured to said shaft engaging and actuating the movable contact.

References Cited in the file of this patent

UNITED STATES PATENTS

| Number | Name | Date |
|---|---|---|
| 866,579 | Burrell | Sept. 17, 1907 |
| 942,482 | Burrell | Dec. 7, 1909 |
| 1,169,980 | McLeod | Feb. 1, 1916 |
| 1,329,451 | Babson et al. | Feb. 3, 1920 |
| 1,386,498 | Hewlett | Aug. 2, 1921 |
| 1,912,994 | Oishei et al. | June 6, 1933 |
| 2,007,163 | Hapgood | July 9, 1935 |
| 2,023,486 | McComb | Dec. 10, 1935 |
| 2,311,921 | Adler, Jr. | Feb. 23, 1943 |